United States Patent [19]

Nagano

[11] Patent Number: 4,507,101
[45] Date of Patent: Mar. 26, 1985

[54] SPEED CONTROL DEVICE FOR A BICYCLE
[75] Inventor: Masashi Nagano, Izumi, Japan
[73] Assignee: Shimano Industrial Company Limited, Osaka, Japan
[21] Appl. No.: 481,452
[22] Filed: Apr. 1, 1983
[30] Foreign Application Priority Data Apr. 7, 1982 [JP] Japan .................................. 57-57909
Apr. 9, 1982 [JP] Japan ............................ 57-52316[U]

[51] Int. Cl.³ .......................... F16H 9/00; F16H 7/22
[52] U.S. Cl. ...................................... 474/82; 474/78; 474/128
[58] Field of Search ...................... 474/78, 80, 82, 128

[56] References Cited

U.S. PATENT DOCUMENTS

| 3,394,604 | 7/1968 | Kimura | 474/82 |
| 4,030,375 | 6/1977 | Nagano | 474/82 |
| 4,106,356 | 8/1978 | Nagano et al. | 474/82 |
| 4,132,119 | 1/1979 | Nagano et al. | 474/82 |
| 4,185,510 | 1/1980 | Juy | 474/82 |
| 4,198,873 | 4/1980 | Nagano et al. | 474/82 |
| 4,229,987 | 10/1980 | Fujimoto | 474/82 |
| 4,322,209 | 3/1982 | Shimano | 474/82 |
| 4,384,864 | 5/1983 | Bonnard | 474/82 |

Primary Examiner—Stephen J. Novosad
Assistant Examiner—Bruce M. Kisliuk
Attorney, Agent, or Firm—Stevens, Davis, Miller & Mosher

[57] ABSTRACT

A speed control device for a bicycle, comprising a speed control lever and a derailleur having a positioning mechanism, the speed control lever being constructed to return a movable member at the derailleur when operated in overshift, and the derailleur is constructed to move the movable member toward a sprocket to engage with a driving chain by means of a driving force acting therein when operated in undershifting.

12 Claims, 26 Drawing Figures

SPEED CONTROL DEVICE FOR A BICYCLE

FIELD OF THE INVENTION

This invention relates to a speed control device for a bicycle, and more particularly to a speed control device for a bicycle, comprising a speed control lever and a derailleur, the control lever being operated to actuate the derailleur so that a driving chain carried by a chain guide at the derailleur is switched to one of the multistage sprockets for changing to a plurality of bicycle speeds.

The derailleur includes a four member linkage mechanism comprising a base member, two linkage members and a movable member carrying the chain guide, so that the control lever is operated to pull a control wire, move the movable member with respect to the base member, and shift the chain guide axially of the multistage sprockets, thereby switching the driving chain to a desired sprocket for changing the bicycle speed.

BACKGROUND OF THE INVENTION

Generally, this kind of speed control device applies a rotational resistance to the control lever for overcoming a return spring to thereby stop the chain guide at a predetermined position to maintain a desired speed-change stage.

In this case, movement of a switched chain cannot be sensed by a cyclist. Hence, a positioning device has been proposed which is provided at one member of the linkage mechanism with a positioning plate including a plurality of recesses corresponding to the number of speed change stages and carries a retainer engageable with each recess at another member movable relative to the one member so that the retainer during the speed changing engages with one recess to determine the speed change stage and the cyclist can read out the movement of the chain through the clicking feel from engagement of the retainer with the recess.

In a case where the control wire is operated for changing the bicycle speed, especially when the chain is switched from a larger diameter sprocket to a smaller diameter one, the cyclist, especially an unskilled one, although a positioning mechanism is provided, may stop the speed changing operation before or beyond the latter setting position without accurately meeting the desired position. Hence, the retainer at the positioning mechanism may come to a halt near the border between the recesses, causing the chain to contact with the sprocket on the way of chain switching or to one-sidedly engage with the same, thus creating the problem of generation of noise, or unexpected wear in the sprocket and chain.

Accordingly, it is desirable that the chain, even when the control lever is improperly operated, is automatically exactly switched to the desired sprocket without being kept in improper contact therewith.

SUMMARY OF THE INVENTION

In the light of the above problem, this invention has been designed. An object of the invention is to provide a speed control device for a bicycle, which allows the cyclist to know of the speed-change stage number through a clicking feel and to switch the chain exactly to a selected sprocket even with excessive or insufficient operation of the control wire.

The speed control device of the invention comprises a speed control lever and a derailleur, the lever comprising a lever body freely rotatable and supporting the control wire and a rotary member rotatable under a predetermined rotational resistance. The lever body rotates in association with the rotary member through a predetermined space for free movement, the derailleur is provided with a four member link mechanism comprising a base member, two linkage members, and a movable member having a chain guide and with a positioning mechanism which sets the chain guide in position, so that the lever pulls the control wire to move forward the movable member with respect to the base member and return it by a return spring. Also, one member, which moves independently of two members moving relative to each other and providing the positioning mechanism, supports the control wire or an outer sheath therefor and is made movable in a predetermined range with respect to another member movable relative to the one member, so that, after the one member moves in the predetermined range, the positioning mechanism is actuated.

In other words, when the control lever is operated in excess to bring the chain into contact with the chain-switched sprocket, that is, in a condition of overshifting, the return spring is used to forcibly move the movable member, while, when the lever is operated insufficiently to bring the chain into contact with the sprocket to be switched, that is, in condition of undershifting, tension of the driven chain is used to forcibly move the movable member, thereby ensuring the switching of the chain to the sprocket.

Accordingly, this invention, when the bicycle speed is changed by the derailleur, allows the cyclist to know the speed-change stage number through the clicking feel through the positioning mechanism and also can switch the chain with accuracy to the sprocket, especially from a smaller diameter sprocket to a larger diameter one, even when the control wire is operated improperly in overshift or undershift, thereby eliminating the generation of noise and wear caused by contact of the chain with the sprocket.

In other words, when excessive speed control allows the chain guide to move beyond the desired set position at the positioning mechanism, the cyclist can merely release the lever to automatically restore the chain guide to the desired set position without restoring the lever to that extent of overshift. As a result, the one-sided engagement or improper contact of the chain with the sprocket is reliably eliminated.

When the control wire is operated insufficiently to keep the chain guide in contact with the sprocket without engaging therewith, because of short movement, or the chain engages one-sidedly with the sprocket, tension of the driven chain can automatically move the movable member, thereby moving the chain guide forward to the desired set position. As a result, the chain is not left in improper contact with the sprocket.

The above and other related objects and features of the invention will be apparent from the following description which is provided in connection with the accompanying drawings.

BRIEF DESCRIPTION OF THE DRAWINGS

FIGS. 9 through 11 show a modified embodiment of the control lever, in which

DETAILED DESCRIPTION OF THE INVENTION

The speed control device of the invention comprises a speed control lever L and a derailleur D. At first, explanation will be given on an embodiment of control lever L.

Figures 1, 2, 3, 4:
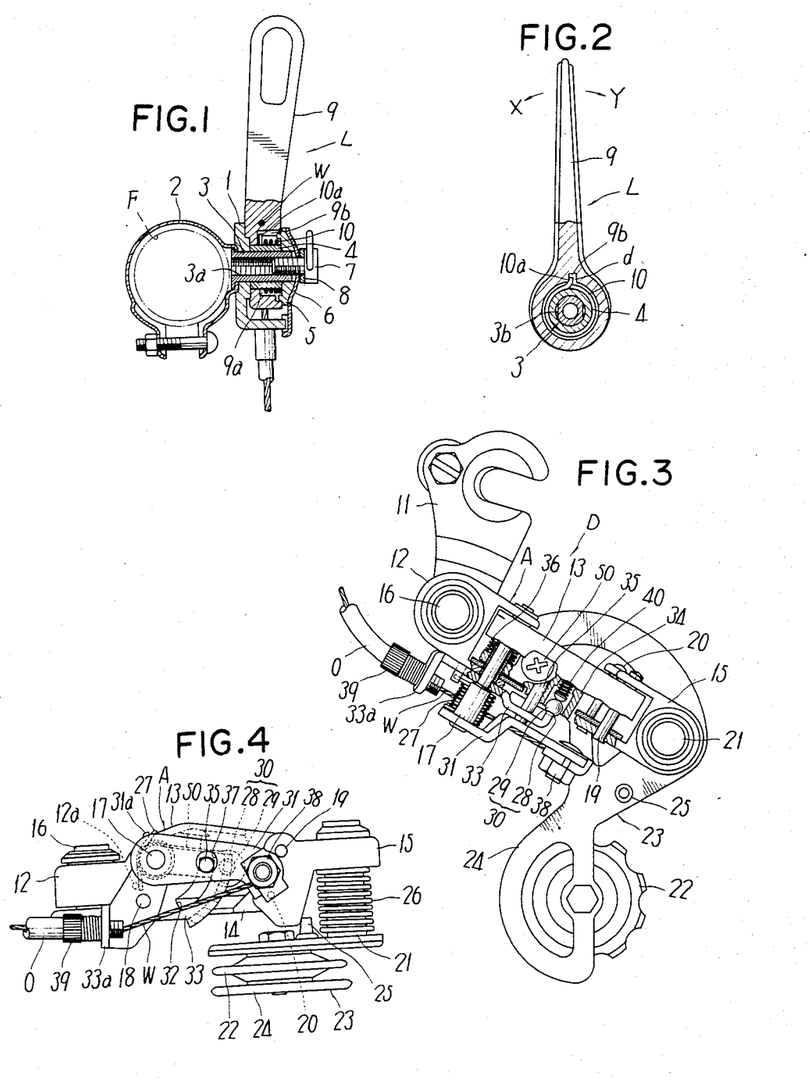
FIG. 1 is a partially cutaway front view of an embodiment of a speed control device of the invention.
FIG. 2 is a partially cutaway front view of the relation between the lever body of a speed control lever and a frictional rotary member in association with each other.
FIG. 3 is a front view of an embodiment of a derailleur used in the speed control device in FIG. 1.
FIG. 4 is a bottom view of the derailleur in FIG. 3.
Figure 5:
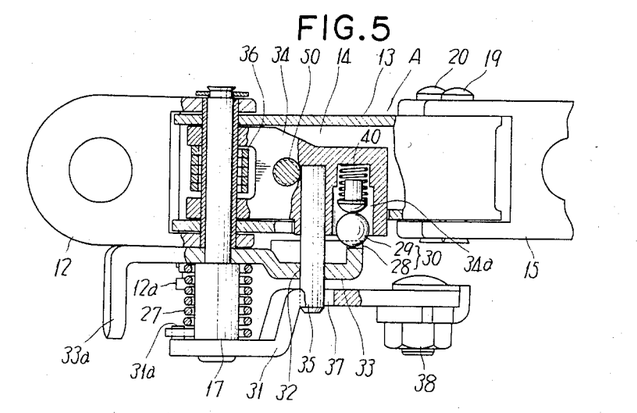
FIG. 5 is a partially enlarged front view thereof.

Referring to FIGS. 1 and 2, reference numeral 1 designates a fixing member mounted to a frame F or a handle bar of a bicycle by use of a tightening band 2, the fixing member 1 supporting a tubular shaft 3 having at the inner periphery thereof a screw thread 3a and at the outer periphery flat portions 3b.

Reference numeral 4 designates a frictional rotary member supported rotatably to the tubular shaft 3 under a predetermined rotational resistance, the rotary member 4 being cylindrical as shown in FIGS. 1 and 2. The rotary member 4 is biased by a biasing plate 5 supported non-rotatably to the tubular shaft 3 through the flat portions 3b and is given a rotational resistance in such a manner that the biasing plate 5 contacts at the outer surface with a cover plate 6 not-rotatably retained to the fixing member 1 and an adjusting screw 7 screws with the screw thread 3a at tubular shaft 3 through a washer 8 to bring the biasing plate 5 into press-contact with the rotary member 4 through the cover plate 6. The screw 7 screwably adjusts the rotational resistance to an extent that it overcomes the force of a return spring in the derailleur to be discussed below.

The rotary member 4 supports on its outer periphery a lever body 9 havng a boss and a control portion. Lever body 9 retains near the boss a control wire W, the boss of lever body 9 having at the center a shaft bore fit to an outer diameter of rotary member 4 and an annular chamber 9a in continuation of the shaft bore, the chamber 9a being provided at one side with a retaining groove 9b extending radially outwardly of the boss.

Also, the lever body 9 is connected in association with the rotary member 4 through a first association mechanism which employs a clutch spring 10 as shown in FIGS. 1 and 2. The clutch spring 10 is wound onto the rotary member 4 and is retained at one end to the retaining groove 9b at the lever body 9 and coiled at the other end slidably onto the rotary member 4.

The clutch spring 10, when the lever body 9 is turned against the return spring at the derailleur to pull the control wire W in the direction of the arrow X in FIG. 2, expands its diameter to leave the rotary member 4 and when the lever body 9 is released the clutch spring 10 is tightened by a spring force of return spring transmitted through the wire W. Thus, the lever body 9, when the clutch spring 10 is tightened, is integrated with the rotary member 4 and subjected to the rotational resistance against restoration thereby being kept stationary at the controlled position. Conversely, the clutch spring 10, when the lever body 9 is turned in the same direction as the return spring (in the direction of arrow Y in FIG. 2), increases its tightening force, so that the lever body 9 turns integrally with the rotary member 4 to reach the desired speed change stage, and then is released to keep the rotary member 4 stationary at the desired position.

The first association mechanism allows the lever body 9 to move freely within a predetermined space. In detail, referring to FIGS. 1 and 2, the retaining groove 9b is larger in width circumferential of chamber 9a than the bent end 10a of clutch spring 10 retained into the groove 9b to thereby form a gap between the wall of groove 9b and the bent end 10a, thus allowing the lever body 9 to freely turn to an extent of the gap width.

Accordingly, the lever body 9, when released after pulling the wire W, is made restorable to a fixed extent with respect to an amount of the pull of wire W.

The restoration amount is made about equal to the movement of a chain which has one-sidedly engaged with the sprocket so as to contact with the adjacent sprocket and thereafter returns toward the thicknesswise center of the engaged sprocket.

Next, explanation will be given on an embodiment of the derailleur of the invention in accordance with FIGS. 3 through 8.

In the drawings, a rear derailleur is shown which comprises a four member linkage mechanism comprising a base member 12 pivotally supported to a fixing member 11, two parallel linkage members 13 and 14, and a movable member 15 as shown in FIGS. 3 and 4, the fixing member 11 being fixed to the fork end of the bicycle, the base member 12 being supported swingably to the fixing member 11 through a horizontal pivot 16.

The base member 12 is provided at one side with a pair of mounting noses, to which the linkage members 13 and 14 are pivotally supported through a pair of pins 17 and 18, the movable member 15 being pivoted to free ends of linkage members 13 and 14 through a pair of pins 19 and 20.

The movable member 15 shaped like the base member 12 is provided at one side with a pair of mounting noses which are opposite to each other and pivoted to the linkage members 13 and 14, and at the other side with a chain guide 23 which carries a guide pulley (not shown) and a tension pulley 22 and is mounted to the movable member 15 rotatably only in a given range through a horizontal pivot 21 parallel to the horizontal pivot 16, so that the linkage members 13 and 14 swing to move the movable member 15 transversely with respect to the base member 12 from the high speed stage shown in FIG. 4 to the low speed stage.

The chain guide 23 comprises the guide pulley, tension pulley 22, and a change-over frame 24, is supported rotatably to the movable member 15 through the pivot 21, is controlled in a rotation range by a stopper 25 and is biased clockwise in FIG. 3 by a tension spring 26 coiled around the pivot 21, the tension spring 26 serving to apply tension of the chain carried by the guide pulley and tension pulley 22.

The linkage mechanism A is provided with a return spring 27 to bias the movable member 15, and in turn the chain guide 23 toward the smaller diameter sprocket, and also with a positioning mechanism 30 including a number of recesses 28 corresponding in number to the number of speed change stages and a retainer 29 engageable with any one of recesses.

Next, explanation will be given on the positioning mechanism 30.

Referring to FIGS. 3 through 8, the base member 12 at the linkage mechanism A is provided with a positioning plate 33, the linkage member 13 is provided with an energy conserving member 34 which is operable even when a resistance against a speed change exceeds the predetermined value, the positioning mechanism 30 is provided between the positioning plate 33 and the energy conserving member 34, and a control arm 31 for operating the energy conserving member 34 is provided and associated with the positioning mechanism 30 through a second association mechanism movable relative to the energy conserving member 34 in a given range.

Figure 6:
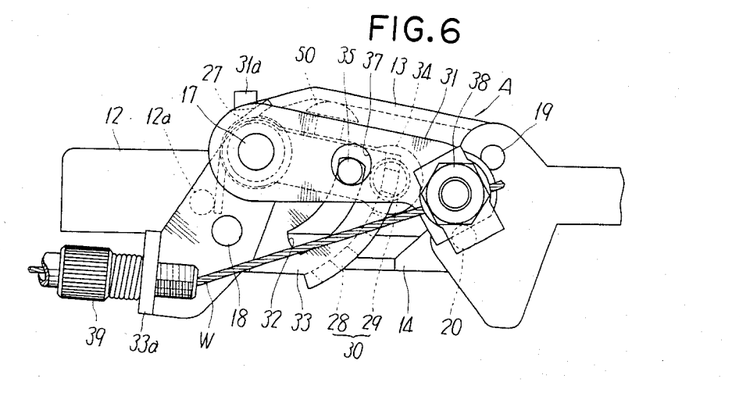
FIG. 6 is a bottom view of the derailleur.

In detail, the control arm 31 is supported to the pin 17 swingably independently of the linkage mechanism A and fixes at the free end the control arm 31 by a fixture 38 and the return spring 27 is interposed between the base member 12 and the control arm 31 and abuts at one end against a stopper 31a provided at the control arm 31 and at the other end against a stopper 12a at the base member 12, thereby biasing the control arm 31 counterclockwise in FIGS. 4 and 6. To the base member 12 is mounted through the pivots 17 and 18 the positioning plate 33 providing the recesses 28 and a guide bore 32 of circular arc. The energy conserving member 34 is supported swingably to an intermediate portion of pivot 17 supporting the control arm 31 and carries the retainer 29 constituting the positioning mechanism 30 and an engaging pin 35 which constitutes a second association mechanism with the control arm 31. An energy conserving spring 36 for biasing the energy conserving member 34 toward the linkage member 13 is interposed between the latter and the energy conserving member 34, and the control arm 31 is provided with a control bore 37 which receives the engaging pin 35 to allow the control arm 31 to move only in a given range with respect to the pin 35, so that the engaging pin 35 is inserted into the control bore 37 to form the second association mechanism, thereby allowing the positioning mechanism 30 to operate after movement of control arm 31 in a given range.

In further detail, the control arm 31 is fixed to an outward extension of pivot 17 in relation of being swingable together therewith, and fixes at the free end a terminal of control wire W through the fixture 38, so that the wire W is pulled to deflect the return spring 27 to thereby swing the control arm 31. The control bore 37, as shown in FIG. 4, is made larger in diameter than the engaging pin 35 to allow the control arm 31 to move with respect to the engaging pin 35 only in a range which is the same as the free rotation range of lever body 9. In addition, the control bore 37 may alternatively be elongate in a circular arc around the pin 17, or formed of a recessed cutout. In brief, the control bore 37 need only be formed to allow the control arm 31 to move only in a given range with respect to the engaging pin 35.

Figure 8:
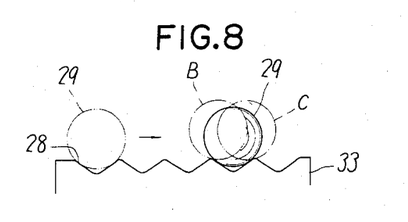
FIG. 8 is a view explanatory of the positional relation between recesses and a retainer in the positioning mechanism.

The positioning plate 33 is layered under the base member 12, fixed at the intermediate portion to the base member 12 through the pins 17 and 18, and directed at one end toward the movable member 15 and provided at the one end face with the recesses 28 as shown in FIG. 8. The other end of positioning plate 33 is raised to provide at the rising end 33a a support 39 for the outer sheath O.

The energy conserving member 34, even when the resistance against the speed change when the chain is not travelling is larger than that when the chain is travelling, swings together with the control arm 31 with respect to the link mechanism A through operation of control wire W to thereby preliminarily switch the positioning mechanism A to a desired speed change stage, and, when the larger resistance is released to start the travelling of the chain, allows the movable member 15 to move toward the above preliminarily set speed change state by means of the restoring operation of energe conserving spring 36. Also, the energy conserving member 34, when the resistance against the speed change is normal, swings integrally with the linkage member 13.

Furthermore, a plurality of recesses 28 at the positioning mechanism 30 are disposed along the path of energy conserving member 34 which shifts during the speed change operation and at the predetermined intervals corresponding to movement of energy conserving member 34. The retainer 29 comprises a rolling member fitted into a recess 34a formed at the energy conserving member 34 and is biased toward the recesses 28 by a spring 40 through a pusher 41.

In addition, in the drawing, reference numeral 50 designates an adjusting screw for adjusting the chain guide 23 in the set position with respect to the base member 12.

Next, explanation will be given on operation of the speed control lever L and derailleur D.

Figure 7:
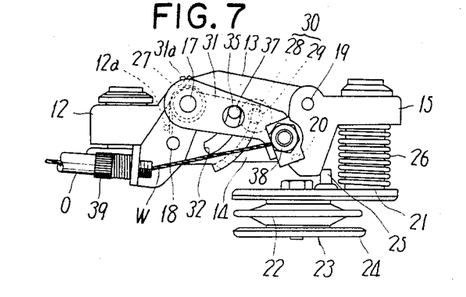
FIG. 7 is a view explanatory of swinging motion of a control lever operated by the control lever with respect to a positioning mechanism.

In the stage where the movable member 15 is positioned at the high speed stage as shown in FIGS. 4 and 6, the control lever L is operated to pull the control wire W, the lever body 9 at first freely rotates within the gap d for free rotation, the return spring 27 abutting against one end of control arm 31 at the derailleur D deflects, and the control arm 31, as shown in FIG. 7, swings in the range of swinging motion thereof set by the control bore 37, in other words, a range which is the same as the range of free rotation of lever body 9. The movable member 15 is stationary during the free rotation of lever body 9 and the swinging motion of control arm 31, but the return spring 27 is disconnected from the linkage member 13 by the aforesaid swinging motion of control arm 31. As a result, the movable member 15 becomes freely movable toward the larger diameter sprocket. Also, the lever body 9, when released, returns through the restoring force of return spring 27, in the reverse direction to the direction of pulling the control wire W.

Next, the lever body having rotated in the free rotation range is operated to pull the control wire W, then the clutch spring 10 deflects to leave the rotary member 4 and the control bore 37 contacts at the end with the engaging pin 35 and thereafter the energy conserving member 34 and linkage members 13 and 14 follow the swinging motion of control arm 31, whereby the movable member 15 moves toward the larger diameter sprocket and the positioning mechanism 30 is actuated. Now, in a case where the operation of lever body 9 is stopped when the retainer 29 at the positioning mechanism 30 moves beyond the border between two adjacent recesses 28 but half way of the next recess, in other words, in a case of undershifting the chain guided by the chain guide 23 contacts with the larger diameter sprocket, but does not engage therewith. In this case, the conventional derailleur stops the chain at the position beyond the border as shown by the phantom line in FIG. 8 so that the chain is kept in contact with the sprocket without exactly engaging therewith, thereby generating noise. The aforesaid construction of the invention, however, keeps the movable member 15 free, whereby, even when the lever operation is stopped, a driving force acting on the chain allows the movable member 15 to move toward the larger diameter sprocket in the aforesaid range of swinging motion of control arm 31. Hence, the chain in contact with the larger diameter sprocket can reliably engage therewith, at which time the retainer 29 also engages accurately with a desired recess and is maintained in the position set by the positioning mechanism 30. On the other hand, the chain may contact with the sprocket to be raised therewith and then engage therewith according to the quantity of pull of control wire W, at which time the quantity, if insufficient, causes the inner link plate of the chain to contact with the sprocket having engaged with the chain. Accordingly, if the control wire W is stopped in operation in the above condition, noise may be generated. Also, the aforesaid construction, even in such condition, allows the movable member 15 to move similarly in the range of swinging motion by means of the driving force applied to the chain, thereby making it possible to maintain the chain guide 23 at the desired speed change position set by the positioning mechanism 30.

When the control wire W is pulled to allow the retainer 29 to move beyond the root of the desired recess 28 toward the flank at a side of the next recess 28, in other words, in a case of overshifting the conventional derailleur, when the lever body 9 is released, stops the retainer 29 halfway between the root of a desired recess 28 and the border to the next recess 28 to thereby keep the chain guided by the chain guide 23 in contact with another adjacent larger diameter sprocket, thereby generating noises. The aforesaid construction of the invention, however, makes the lever body 9 rotatable to restore in the range of gap d, whereby a restoring force of return spring 27 allows the lever body 9 to return in the same range. As a result, the movable member 15 returns by the return spring 27 toward the smaller diameter sprocket in the range of restoration of lever body 9, whereby the retainer 29 also engages exactly with the desired recess 28 and the chain guide 23 is maintained at the position of the speed change stage set by the positioning mechanism 30.

Figures 9, 11:
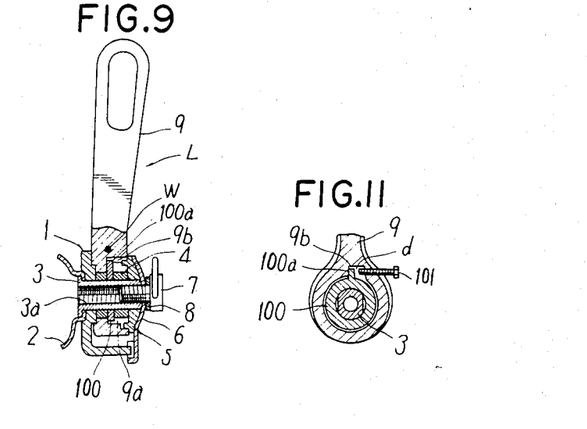
FIG. 9 is a partially cutaway front view thereof corresponding to FIG. 1.
FIG. 11 is a partially omitted sectional view of another modified embodiment of the control lever, corresponding to FIG. 8, FIGS. 12 through 21 are views of modified embodiments of the derailleur respectively.
Figure 10:
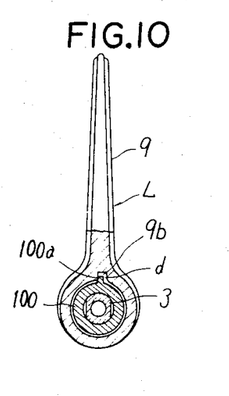
FIG. 10 is a partially cutaway front view of the same corresponding to FIG. 2.

Alternatively, the first association mechanism may, as shown in FIGS. 9 and 10, provide a rotary member 4 divided into two at an intermediate portion and a disc 100 having an engaging projection 100a engageable with the engaging groove 9a and interposed between the divided rotary member 4 to thereby apply the rotational resistance to the disc 100, or the disc may be integral with the rotary member 4.

Also, the quantity of restoring rotation of lever body 9 may, as shown in FIG. 11, be adjusted desirably screwably by a screw 101 passing through the lever body 9 and entering the gap d.

Alternatively, the derailleur instead of being constructed as described above may be constructed as shown in FIGS. 12 through 22.

Figure 12:
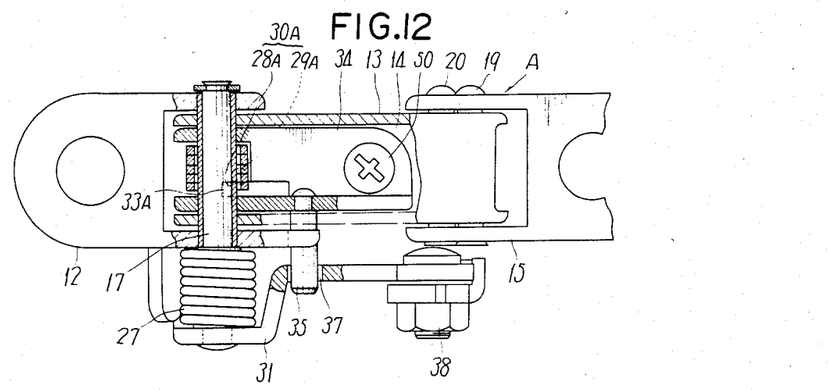
Figure 13:
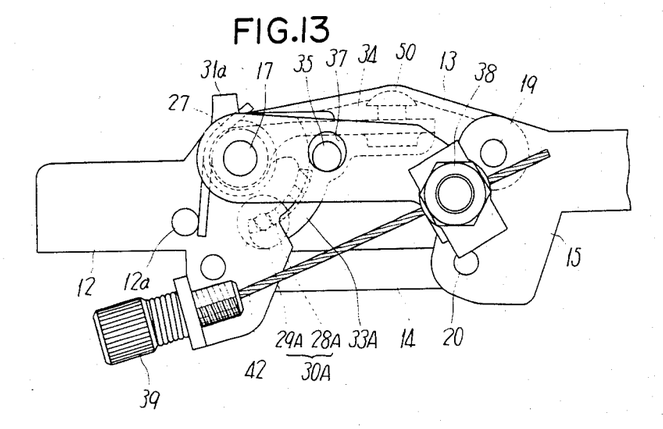

In detail, in FIGS. 12 and 13, a positioning mechanism 30A is provided between the base member 12 and the energy conserving member 34 pivotally supported to the pin 17, where other components are the same as those in FIGS. 3 and 4. In this case, a positioning plate 33A is provided at the energy conserving member 34 and a cylindrical holder 42 holding a retainer 29A is provided at the base member 12.

Figure 14:
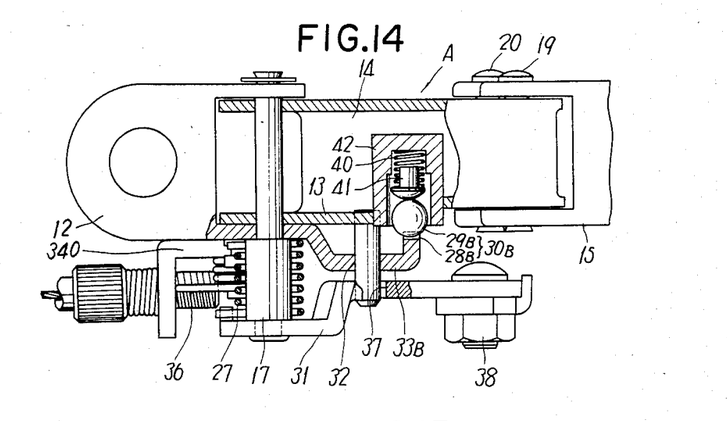
Figure 15:
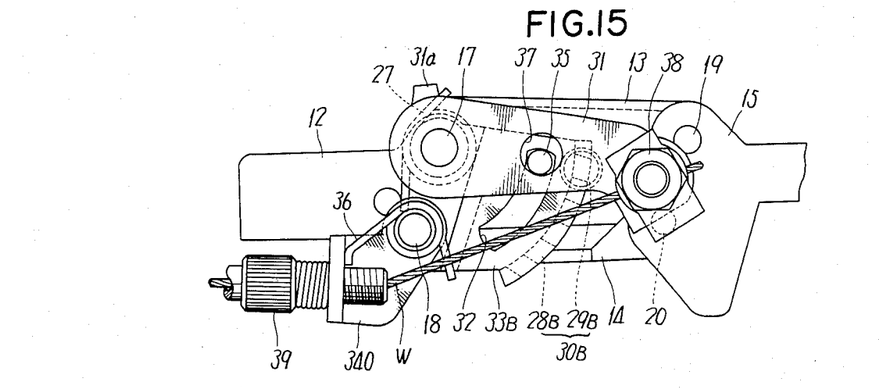

In FIGS. 14 and 15, a positioning mechanism 30B is provided between the base member 12 and the linkage member 13 and an energy conserving member 340 is pivoted to the pin 18 at the base member 12 and carries the support 39 for the outer sheath O. In this case, a positioning plate 33B having recesses 28B is provided at the base member 12, a cylindrical holder 42 holding a retainer 29B is provided at the linkage member 13, and a guide bore 32 for the engaging pin 35 is provided at the positioning plate 33B.

Figure 16:
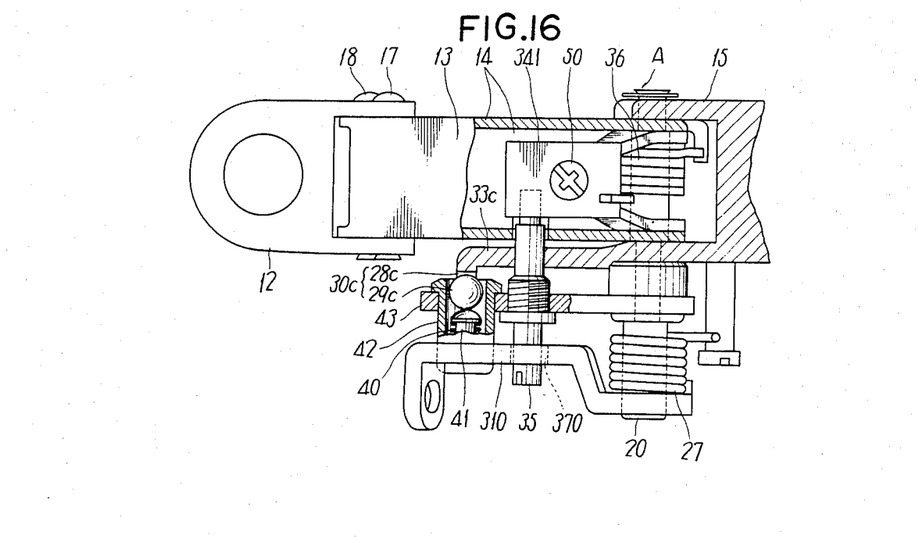
Figure 17:
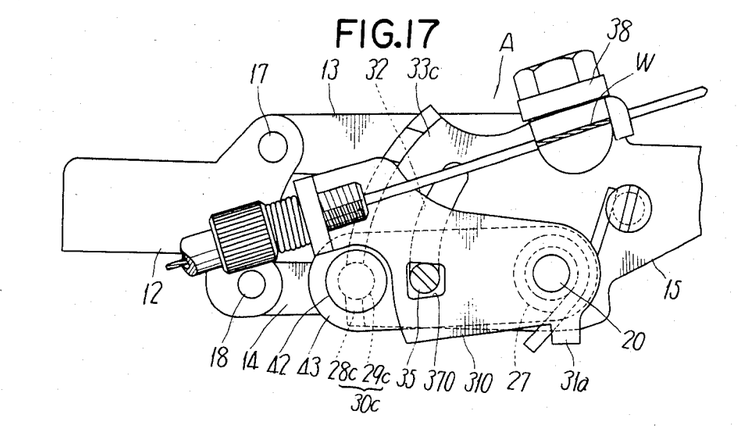

In FIGS. 16 and 17, a control arm 310 is supported to the pin 20 at the movable member 15, the return spring 27 is inserted between the control arm 310 and the movable member 15, the control arm 310 supports the outer sheath O, and the pin 20 supports an energy conserving plate 341 and a holder plate 43. A positioning mechanism 30C is provided between the holder plate 43 and the movable member 15 so that the holder plate 43 and energy conserving plate 341 are associated with each other through the engaging pin 35, and a control bore 370 is provided at the control arm 310 so that the engaging pin 35 is inserted into the control bore 370, thereby constituting the second association mechanism. In this case, a positioning plate 33C having recesses 28C is integral with the movable member 15, the cylindrical holder 42 holding the retainer 29C is mounted on the holder plate 43, and the guide bore 32 for the engaging pin 35 is provided at the positioning plate 33C.

Figure 18:
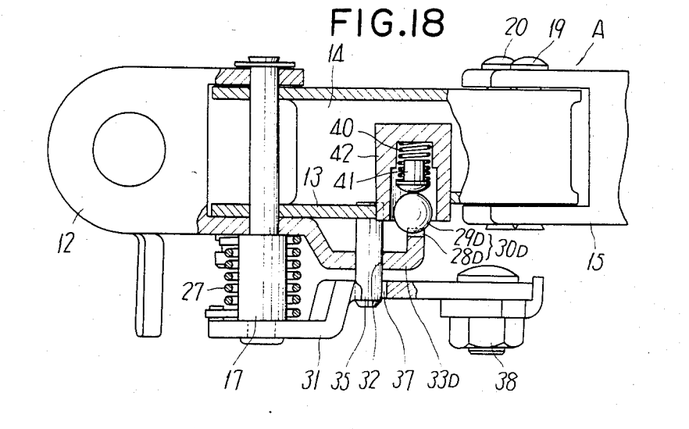
Figure 19:
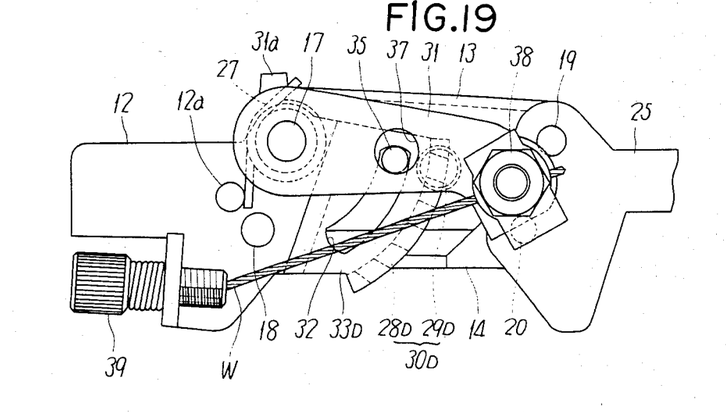

In FIGS. 18 and 19, no energy conserving plate is used, a positioning mechanism 30D is provided between the base member 12 and the linkage member 13, the same as in FIGS. 14 and 15, and the engaging pin 35 insertable into the control bore 37 at the control arm 31 is provided at the linkage member 13. In this case, a positioning plate 33D having recesses 28D is integral with the base member 12 and the cylindrical holder 42 holding a retainer 29D is mounted to the linkage member 13.

In a case of using no energy conserving member, the control arm 31 may alternatively be supported to the pin 20 at the movable member 15, the return spring 27 may be interposed between the control arm 31 and the movable member 15, the positioning mechanism 30 may be provided between the linkage member 14 and the movable member 15, and the outer sheath O may be supported to the control wire 31 and the control wire W to the movable member 15, or the positioning mechanism 30D may be provided between the linkage members 13 and 14 and other components may be constructed the same as in FIGS. 18 and 19, the above construction being not shown.

Figure 20:
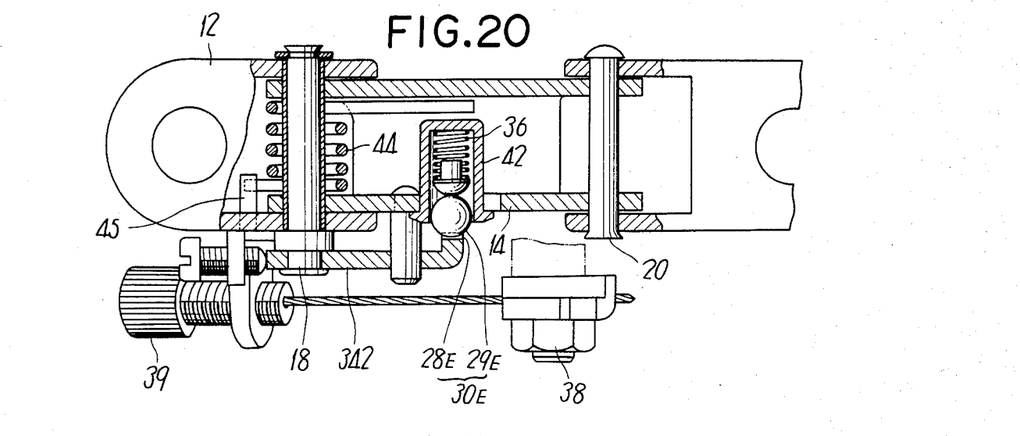
Figure 21:
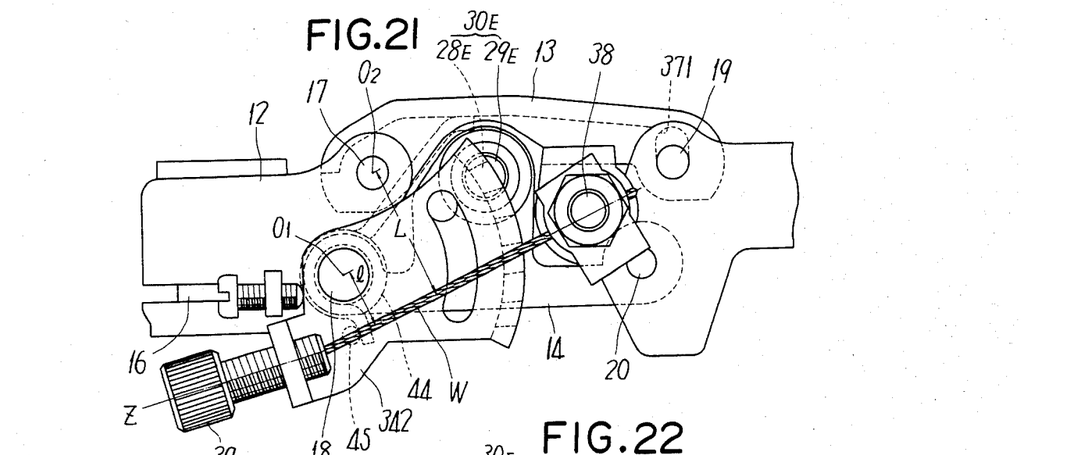
Figure 22:
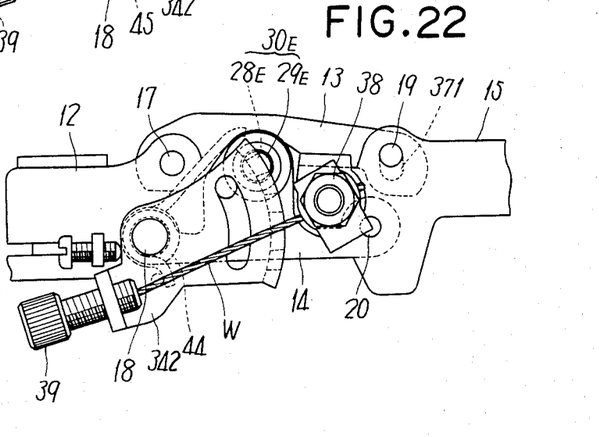
FIG. 22 is a view explanatory of operation of a linkage member with resepct to the positioning mechanism, corresponding to FIG. 21.

In FIGS. 20 and 21, the control arm 31 is omitted, one linkage member 13 or 14 fixedly supports the control wire W through the fixture 38, a control bore 371 is provided at the end of linkage member 13 at a side of movable member 15, and the pin 19 is inserted through the control bore 371 so that the linkage member 13 is associated with the movable member 15 rotatably only in a given range to thereby constitute the second association mechanism, an energy conserving plate 342 is pivoted to the pin 18 at the base member 12, the outer sheath O is supported to the energy conserving plate 342 through the support 39, a positioning mechanism 30E is provided between the energy conserving plate 342 and the other linkage member 14 or 13, and an energy conserving and return spring 44 is wound onto the pin 18, the spring 44 engaging at one end with the inner surface at an intermediate portion of linkage member 13 and at the other end with a stopper 45 provided at the energy conserving plate 342. In this case, when the wire W is pulled, the linkage member 13 only swings within the range of swinging motion set by the control bore 371 as shown in FIG. 22. When the control wire W is further pulled, the end of control bore 371 abuts against the pin 19, and thereafter the other linkage member 14 follows the swinging motion of one linkage member 13, thereby actuating a positioning mechanism 30E.

In addition, in the above case shown in FIGS. 20 and 21, the length of the normal from the center $O_1$ of swinging motion of energy conserving plate 342 to the line of action Z is represented by l, and length of the normal from the pivot point $O_2$ of linkage member 13 to the line Z is represented by L, the lengths l and L are set to be $l < L$. Accordingly, when the moment of the energy conserving and return spring 44 is expressed by M, a force $F_1$ necessary to swing the energy conserving plate 342 against the spring 44 is given by $F_1 = M/l$. A force $F_2$ necessary to move the linkage member 13, and in turn the movable member 15, against the spring 44 is given by $F_2 = M/L$. Since the lengths l, and L have therebetween the relationship of $l < L$ and scarcely change even with swinging motion of each linkage member 13 or 14, the relation $F_1 > F_2$ is always obtained, whereby when the speed change is performed under the normal resistance against the speed change, the linkage members 13 and 14 swing always prior to the swinging motion of energy conserving plate 372, thereby carrying out the speed change without displacement of energy conserving plate 342. In a case where the resistance against the speed change is larger than the normal resistance, the energy plate 342 swings clockwise in FIG. 21 against the spring 44, so that the spring 44 conserves energy, whereby when the resistance is eliminated, the conserved energy can change the bicycle speed to the desired stage.

Alternatively, in FIGS. 20 and 21, the control bore 371 may be formed at the linkage member 14 and the positioning mechanism 30E may be provided between the energy conserving plate 342 and the linkage member 13, or the control wire W may be fixed to the energy conserving plate 342 and the outer sheath O may be supported to the linkage member 13 or 14 at a side of control bore 371, or the control bore 371 may be provided at the movable member 15.

Also, the control arm 31, when in use, may be supported to a pin other than the pins 17, 18, 19 and 20, or the engaging pin 35 may be provided at the control arm 31 and the control bore 37 be provided at the member at the positioning mechanism 30 side.

The retainers 29 and 29A through 29E at the positioning mechanisms 30 and 30A through 30E, which are each held within the recess 34a at the energy conserving plate 34 or in the cylindrical holder 42 through the spring 40 in the above constructions, are preferably movable in a given range with respect to the interior of recess 34a or cylindrical holder 42 and held at both end positions of its movement elastically by the spring 40 respectively.

Figure 23:
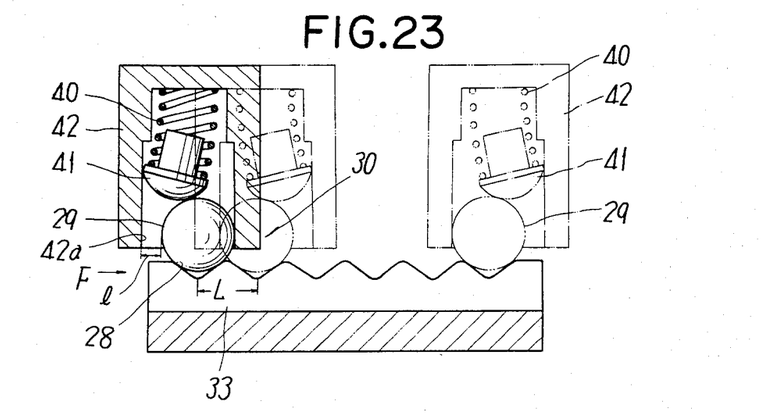
FIG. 23 is an enlarged view of the positioning mechanism.

In detail, in FIG. 23, a gap l is provided between the inner surface or cylindrical holder 42 and the retainer 29 therein, so that the retainer 29 is made movable in a given range and in the moving direction of movable member 15 with respect to the holder 42. A spring 40 biasing the retainer 29 toward the positioning plate 33 and a mountain-shaped pusher 41 which contacts with the retainer 29 and allows it to be positioned either one end in the moving range of pusher 41, are housed within the holder 42. Also, the retainer 29 can elastically be held at both end positions in the moving range, so that the relative movement of holder 42 to the retainer 29 can absorb a play generated between the outer sheath O and the control wire W.

In the above construction, when the control wire W is pulled to swing the energy conserving member 34 and control arm 31 around the pin 17, the cylindrical holder 42 moves together with the member 34 by the gap l with respect to the retainer 29 in the arrow F as shown by the two-dot-chain line in FIG. 23, in other words, the retainer 29 shifts from the right-hand end to the left-hand end in its moving range as shown in FIG. 23, thereby absorbing the play between the outer sheath O and the control wire W. Then, the retainer 29 in contact at the rear end with the inner surface of holder 42 at the rear side in the moving direction thereof, moves together with the holder 42 and engages with each recess 28 in succession, thereby moving the chain guide 23 step by step in length L corresponding to an interval between the widthwise center lines of adjacent sprockets.

Accordingly, in this case of shifting the retainer 29 from the position shown by the solid line to that by the two-dot-chain line in FIG. 23, the chain guide 23 leads to moving in a distance of the sum of gap l and length L or its integer multiple.

Figure 24:
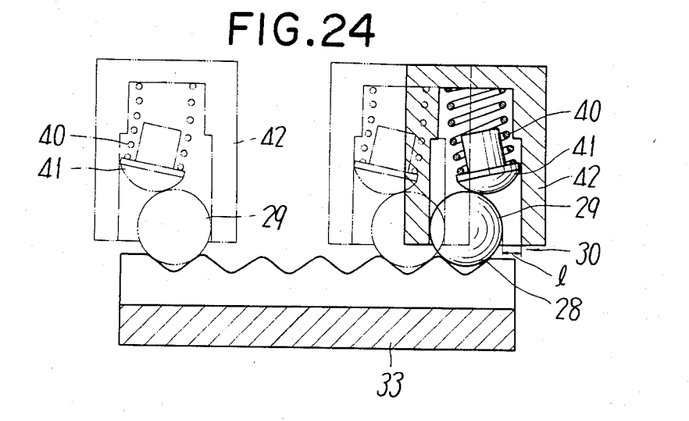
FIG. 24 is an enlarged view explanatory of operation thereof, corresponding to FIG. 23, and FIGS. 25 and 26 are partially enlarged sectional views of modified embodiments of the positioning mechanism.

When the pulled control wire W is released to return the chain guide 23 by the return spring 27, the holder 42, as shown by the solid line in FIG. 24, moves in advance of the retainer 29 and brings it in the position shown by the two-dot-chain line in the same drawing the same as in the former case.

Figure 25:
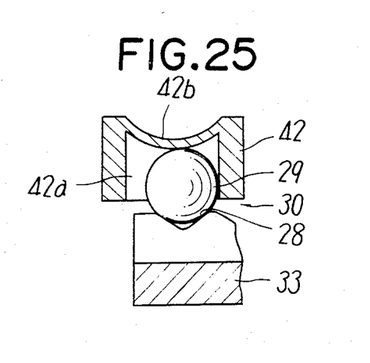
Figure 26:
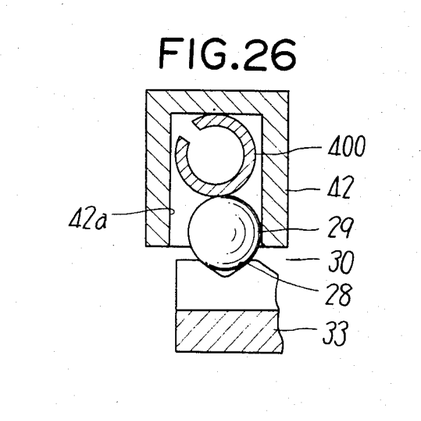

Incidentally, the spring 40 and pusher 41 in the aforesaid embodiments are not indispensable. Alternatively, the holder 42, as shown in FIG. 25, may be made flexible at the portions 42b except for contact portions with the retainer 29, the flexible portion 42b elastically biasing the retainer 29, or it may be baised by an elastic member 400 of C-like shape in section as shown in FIG. 26. Type of biasing means is not critical. In addition, the shape of pusher 41 is not critical, but is preferably mountain-shaped at the contact surface with the retainer 29.

Also, the holder 42 may have an elliptic cavity 42a, or it may be replaced by a furcate holding member, thus not being critical. The retainer 29 preferably uses a rolling member, such as a ball, but may be of other shapes.

Although several embodiments have been described, they are merely exemplary of the invention and not to be constructed as limiting, the invention being defined solely by the appended claims.

What is claimed is:

1. A speed control device for a bicycle comprising a speed control lever and a derailleur, said lever comprising a freely rotatable lever body supporting a control wire, a rotary member rotatable against a predetermined rotational resistance, and a first association mechanism allowing said lever body to move in association with said rotary member through a predetermined interval of free movement, said derailleur including a four member linkage mechanism comprising a base member, two linkage members, and a movable member including a chain guide and a positioning mechanism which sets said chain guide in position, said control wire being connected to said derailleur so that said lever is operable to pull said control wire to move said movable member forward with respect to said base member against a force of a return spring biasing said movable member backward to thereby change the bicycle speed, said derailleur further comprising a member, which operates independently of two members which move relative to each other and are provided with said positioning mechanism, and has a support means for supporting one of said control wire and an outer sheath guiding said wire, and a second association mechanism provided between said member having support means and another member movable relative to said member having said support means, said second association mechanism allowing said member having said support means to be movable in a given range with respect to said another member, whereby said movement in a given range can make said return spring inactive and said movable member freely movable in a given range, so that said positioning mechanism is actuated after the movement of said movable member in a given range.

2. A speed control device for a bicycle according to claim 1, wherein said derailleur is provided with a control arm which operates independently of said four member linkage mechanism, said control arm having had a supporting means for supporting one of said control wire and outer sheath guiding said wire, said return spring being interposed between said control arm and one member of said four member linkage mechanism, and said second association mechanism being provided between said control arm and a movable one of said two members which are provided with said positioning mechanism.

3. A speed control device for a bicycle according to claim 2, wherein said control arm is supported swingably to said base member of said four member linkage mechanism, said return spring being interposed between said control arm and said base member, said positioning mechanism being provided between said base member and one of said linkage members, and said second association mechanism being provided between said control arm and one said linkage member.

4. A speed control device for a bicycle according to claim 2, wherein said control arm is supported swingably to said movable member of said four member linkage mechanism, said return spring being interposed between said control arm and said movable member, said positioning mechanism being provided between said movable member and one of said linkage members, and said second association mechanism being provided between said control arm and one said linkage member.

5. A speed control device for a bicycle according to claim 2, wherein said derailleur is further provided with an energy conserving member having an energy conserving spring, said positioning mechanism being provided between said energy conserving member and said base member of said four member linkage mechanism, and said second association mechanism being provided between said energy conserving member and said control arm.

6. A speed control device for a bicycle according to claim 5, wherein said base member is provided with a positioning plate having a plurality of recesses, said energy conserving member having an retainer engageable with one of said recesses.

7. A speed control device for a bicycle according to claim 5, wherein said energy conserving member is provided with a positioning plate having a plurality of recesses, said base member having a retainer engageable with one of said recesses.

8. A speed control device for a bicycle according to claim 2, wherein said derailleur is provided with an energy conserving member having an energy conserving plate and with a holding member, said energy conserving member and holding member being supported swingable with respect to said movable member, positioning mechanism being provided between said movable member and said holding-member, said second association mechanism being provided between said holding member and said control arm and having a construction for moving said holding member in association with said energy conserving member.

9. A speed control device for a bicycle according to claim 1, wherein said derailleur has an energy conserving member, said positioning mechanism being provided between said energy conserving member and one member of said four member linkage mechanism.

10. A speed control device for a bicycle according to claim 9, wherein said energy conserving member is supported to said base member, said positioning mechanism being provided between said energy conserving member and one of said linkage members at said four member linkage mechanism, said energy conserving member having a support means for supporting one of said control wire and outer sheath, the other of said linkage members having a support means for supporting the other of said control wire and outer sheath, said return spring serving also as an energy conserving spring and being interposed between said energy conserving member and said linkage member having said support means, said second association mechanism being provided between said movable member and said linkage member having said support means.

11. A speed control device for a bicycle according to claim 1, wherein said positioning mechanism comprises a plurality of recesses and a retainer engageable with one of said recesses, said retainer being provided with an elastic member biasing said retainer toward said recesses and being movable in a given range with respect to a holding position for holding said retainer, said retainer being held elastically in position at both end portions in its moving direction.

12. A speed control device for a bicycle according to claim 11, wherein said retainer is provided with a pusher which receives said elastic member and pushes out said retainer.

* * * * *